(12) United States Patent
Tomala et al.

(10) Patent No.: US 11,895,524 B2
(45) Date of Patent: Feb. 6, 2024

(54) DISTINCTION OF MINIMIZATION DRIVE TEST LOGGING THROUGH DIFFERENT RADIO RESOURCE CONTROLLER STATES

(71) Applicant: NOKIA TECHNOLOGIES OY, Espoo (FI)

(72) Inventors: Malgorzata Tomala, Wroclaw (PL); Guillaume Decarreau, Munich (DE); Anna Pantelidou, Massy (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 330 days.

(21) Appl. No.: 17/603,783

(22) PCT Filed: May 2, 2019

(86) PCT No.: PCT/EP2019/061306
§ 371 (c)(1),
(2) Date: Oct. 14, 2021

(87) PCT Pub. No.: WO2020/221464
PCT Pub. Date: Nov. 5, 2020

(65) Prior Publication Data
US 2022/0201526 A1  Jun. 23, 2022

(51) Int. Cl.
*H04W 24/10* (2009.01)
*H04W 76/27* (2018.01)
(Continued)

(52) U.S. Cl.
CPC .......... *H04W 24/10* (2013.01); *H04W 24/08* (2013.01); *H04W 76/27* (2018.02); *H04W 88/08* (2013.01)

(58) Field of Classification Search
CPC ..... H04W 24/10; H04W 24/08; H04W 76/27; H04W 88/08
See application file for complete search history.

(56) References Cited

U.S. PATENT DOCUMENTS

2013/0065535 A1* 3/2013 Zhou ............... H04W 16/18
455/67.11
2013/0155895 A1* 6/2013 Kim ............... H04L 43/067
370/252
(Continued)

OTHER PUBLICATIONS

"MDT for RRC_Inactive state"; Ericsson; 3GPP TSG-RAN WG2 #105 Tdoc R2-1900655 Athens, Greece, Feb. 25-Mar. 1, 2019 ( Year: 2019).*

(Continued)

*Primary Examiner* — Benjamin H Elliott, IV
(74) *Attorney, Agent, or Firm* — Robert P. Michal, Esq.; Carter, DeLuca & Farrell LLP

(57) ABSTRACT

Systems, methods, apparatuses, and computer program products for distinguishing minimization of drive tests (MDT) logging through different radio resource controller (RRC) states. One method may include receiving, from a network element, a logged measurement configuration comprising specific content for a user equipment depending on a connection state of the user equipment. The method may also include validating the logged measurement configuration, wherein the validating is embodied by the network element prior to transitioning to a different user equipment state, or by a user equipment after entering a logging state, for which the logged measurement configuration was designated. The method may further include performing logging of a measurement according to the content of the logged measurement configuration. In addition, the method may include tagging the logged measurement. The method may also include transmitting the tagged logged measurement to the network element.

19 Claims, 9 Drawing Sheets

(51) Int. Cl.
*H04W 24/08* (2009.01)
*H04W 88/08* (2009.01)

(56) References Cited

U.S. PATENT DOCUMENTS

| | | | |
|---|---|---|---|
| 2015/0223094 A1* | 8/2015 | Tomala | H04W 24/10 455/67.11 |
| 2015/0281990 A1* | 10/2015 | Kelley | H04W 24/10 370/241 |
| 2017/0105136 A1* | 4/2017 | Reider | H04W 24/10 |
| 2021/0092793 A1* | 3/2021 | Centonza | H04W 76/27 |
| 2021/0120448 A1* | 4/2021 | Zhang | H04W 76/18 |
| 2021/0344430 A1* | 11/2021 | Fang | H04B 17/29 |
| 2021/0345153 A1* | 11/2021 | Kimba Dit Adamou | H04W 76/20 |
| 2022/0022078 A1* | 1/2022 | Kim | H04W 24/10 |
| 2022/0085950 A1* | 3/2022 | Yang | H04W 76/15 |
| 2022/0104050 A1* | 3/2022 | Liu | H04W 24/10 |
| 2022/0151011 A1* | 5/2022 | Chang | H04W 76/18 |
| 2022/0201526 A1* | 6/2022 | Tomala | H04W 76/27 |

OTHER PUBLICATIONS

"Discussion on solutions for MDT"; Huawei et al.; 3GPP TSG-RAN WG2 Meeting #105 R2-1901856 Athens, Greece, Feb. 25-Mar. 1, 2019 (Year: 2019).*

"Discusson on MDT procedures for Inactive UEs"; CMCC; 3GPP TSG RAN WG2 Meeting #105 R2-1901950 Athens, Greece, Feb. 25-Mar. 1, 2019 (Year: 2019).*

"Discussion of MDT for RRC_Inactive"; Qualcomm; 3GPP TSG-RAN WG2 Meeting #106 R2-1905551 Reno, Nevada, US, May 13-17, 2019 (Year: 2019).*

Communication pursuant to Article 94(3) EPC dated Apr. 19, 2023, corresponding to European Patent Application No. 19722087.4.

International Search Report and Written Opinion dated Oct. 24, 2019 corresponding to International Patent Application No. PCT/EP2019/061306.

Huawei et al., "Considerations on Inactive state for MDT," 3GPP Draft; R2-1904825, 3GPP TSG-RAN WG2 Meeting #105bis, Xi'an, China, Mar. 29, 2019, XP051694012.

Nokia et al., "NR MDT for RRC Inactive," 3GPP Draft; R2-1904239, 3GPP TSG-RAN WG2 Meeting #105bis, Xian, China, Apr. 6, 2019, XP051701549.

CATT, "Logged MDT in IDLE or Inactive mode," 3GPP Draft; R2-1903159, 3GPP TSG-RAN WG2 Meeting #105bis, Xi'an, China, Apr. 6, 2019, XP051700512.

3GPP TR 37.816 V0.3.0 (Apr. 2019), Technical Report, 3rd Generation Partnership Project; Technical Specification Group Radio Access Network; Evolved Universal Terrestrial Radio Access (E-UTRA) and NR; Study on RAN-centric data collection and utilization for LTE and NR (Release 16), Apr. 29, 2019, XP051712424.

Nokia et al., "Logged MDT for RRC_Inactive state," 3GPP Draft; R2-1910713, 3GPP TSG-RAN WG2 Meeting #107, Prague, Czech Republic, Aug. 16, 2019, XP051768481.

CMCC, "Revised SID: Study on RAN-centric data collection and utilization for LTE and NR," RP-182105, 3GPP TSG RAN Meeting #81, Gold Coast, Australia, Sep. 10-13, 2018.

3GPP TS 37.320 V15.0.0 (Jun. 2018), Technical Specification, 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15), Jun. 2018.

* cited by examiner

DISTINCTION OF MINIMIZATION DRIVE TEST LOGGING THROUGH DIFFERENT RADIO RESOURCE CONTROLLER STATES

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to apparatuses, systems, and/or methods for distinguishing minimization of drive test (MDT) logging through different radio resource controller (RRC) states.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local breakout and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), and critical communications (autonomous vehicles, traffic safety, real-time analytics, time-critical control, healthcare applications).

SUMMARY

In accordance with some example embodiments, a method may include receiving, from a network element, a logged measurement configuration including specific content for a user equipment depending on a connection state of the user equipment. The method may also include validating the logged measurement configuration. The validating may be embodied by the network element prior to transitioning to a different user equipment state or by a user equipment after entering a logging state, for which the logged measurement configuration was designated. The method may further include performing logging of a measurement according to the content of the logged measurement configuration. In addition, the method may include tagging the logged measurement. The method may also include transmitting the tagged logged measurement to the network element. In an example embodiment, the tagging may identify during which connection state of the user equipment was in when the logged measurement was made.

In accordance with some example embodiments, an apparatus may include means for receiving, from a network element, a logged measurement configuration including specific content for a user equipment depending on a connection state of the user equipment. The apparatus may also include means for validating the logged measurement configuration. The validating may be embodied by the network element prior to transitioning to a different user equipment state or by the apparatus after entering a logging state, for which the logged measurement configuration was designated. The apparatus may further include means for performing logging of a measurement according to the content of the logged measurement configuration. In addition, the apparatus may include means for tagging the logged measurement. The apparatus may also include means for transmitting the tagged logged measurement to the network element. In an example embodiment, the tagging may identify during which connection state of the user equipment was in when the logged measurement was made.

In accordance with some example embodiments, an apparatus may include at least one processor and at least one memory including computer program code. The at least one memory and the computer program code may be configured to, with the at least one processor, cause the apparatus at least to receive, from a network element, a logged measurement configuration including specific content for a user equipment depending on a connection state of the user equipment. The apparatus may also be caused to validate the logged measurement configuration. The validating may be embodied by the network element prior to transitioning to a different user equipment state or by the apparatus after entering a logging state, for which the logged measurement configuration was designated. The apparatus may further be caused to perform logging of measurements according to the content of the logged measurement configuration. In addition, the apparatus may be caused to tag the logged measurements. The apparatus may also be caused to transmit the tagged logged measurement to the network element. In an example embodiment, the tagging may identify during which connection state of the user equipment was in when the logged measurement was made.

In accordance with some example embodiments, a non-transitory computer readable medium can be encoded with instructions that may, when executed in hardware, perform a method. The method may receive, from a network element, a logged measurement configuration including specific content for a user equipment depending on a connection state of the user equipment. The method may also validate the logged measurement configuration. The validating may be embodied by the network element prior transitioning to a different user equipment state or by a user equipment after entering a logging state, for which the logged measurement configuration was designated. The method may further perform logging of measurements according to the content of the logged measurement configuration. In addition, the method may tag the logged measurements. The method may also transmit the tagged logged measurement to the network element. In an example embodiment, the tagging may identify during which connection state of the user equipment was in when the logged measurement was made.

In accordance with some example embodiments, a computer program product may perform a method. The method may receive, from a network element, a logged measurement configuration including specific content for a user equipment depending on a connection state of the user equipment. The method may also validate the logged measurement configuration. The validating may be embodied by the network element prior transitioning to a different user equipment state or by a user equipment after entering a logging state, for which the logged measurement configuration was designated. The method may further perform logging of measurements according to the content of the logged measurement configuration. In addition, the method may tag the logged measurements. The method may also transmit the tagged logged measurement to the network element. In an example embodiment, the tagging may identify during which connection state of the user equipment was in when the logged measurement was made.

In accordance with some example embodiments, an apparatus may include circuitry configured to receive, from a network element, a logged measurement configuration including specific content for a user equipment depending on a connection state of the user equipment. The circuitry may also be configured to validate the logged measurement configuration. The validating may be embodied by the network element prior to transitioning to a different user equipment state or by a user equipment after entering a logging state, for which the logged measurement configuration was designated. The circuitry may further be configured to perform logging of measurements according to the content of the logged measurement configuration. In addition, the circuitry may be configured to tag the logged measurements. The circuitry may also be configured to transmit the tagged logged measurement to the network element. In an example embodiment, the tagging may identify during which connection state of the user equipment was in when the logged measurement was made.

In accordance with some example embodiments, a method may include receiving, from a core network element, a logged measurement configuration message including specific content for a user equipment depending on a connection state of the user equipment. The method may also include validating the logged measurement configuration message prior to transitioning the user equipment to a different connection state. The method may further include forwarding the logged configuration message to the user equipment. In addition, the method may include receiving a tagged logged measurement from the user equipment. In an example embodiment, the tagged logged measurement may identify during which connection state of the user equipment was in when the logged measurement was made.

In accordance with some example embodiments, an apparatus may include means for receiving, from a core network element, a logged measurement configuration message including specific content for a user equipment depending on a connection state of the user equipment. The apparatus may also include means for validating the logged measurement configuration message prior to transitioning the user equipment to a different connection state. The apparatus may further include means for forwarding the logged configuration message to the user equipment. In addition, the apparatus may include means for receiving a tagged logged measurement from the user equipment. In an example embodiment, the tagged logged measurement may identify during which connection state of the user equipment was in when the logged measurement was made.

In accordance with some example embodiments, an apparatus may include at least one processor and at least one memory including computer program code. The at least one memory and the computer program code may be configured to, with the at least one processor, cause the apparatus at least to receive, from a core network element, a logged measurement configuration message including specific content for a user equipment depending on a connection state of the user equipment. The apparatus may also be caused to validate the logged measurement configuration message prior to transitioning the user equipment to a different connection state. The apparatus may further be caused to forward the logged configuration message to the user equipment. In addition, the apparatus may be caused to receive a tagged logged measurement from the user equipment. In an example embodiment, the tagged logged measurement may identify during which connection state of the user equipment was in when the logged measurement was made.

In accordance with some example embodiments, a non-transitory computer readable medium can be encoded with instructions that may, when executed in hardware, perform a method. The method may receive, from a core network element, a logged measurement configuration message including specific content for a user equipment depending on a connection state of the user equipment. The method may also validate the logged measurement configuration message prior to transitioning the user equipment to a different connection state. The method may further forward the logged configuration message to the user equipment. In addition, the method may receive a tagged logged measurement from the user equipment. In an example embodiment, the tagged logged measurement may identify during which connection state of the user equipment was in when the logged measurement was made.

In accordance with some example embodiments, a computer program product may perform a method. The method may receive, from a core network element, a logged measurement configuration message including specific content for a user equipment depending on a connection state of the user equipment. The method may also validate the logged measurement configuration message prior to transitioning the user equipment to a different connection state. The method may further forward the logged configuration message to the user equipment. In addition, the method may receive a tagged logged measurement from the user equipment. In an example embodiment, the tagged logged measurement may identify during which connection state of the user equipment was in when the logged measurement was made.

In accordance with some embodiments, an apparatus may include circuitry configured to receive, from a core network element, a logged measurement configuration message including specific content for a user equipment depending on a connection state of the user equipment. The circuitry may also be configured to validate the logged measurement configuration message prior to transitioning the user equipment to a different connection state. The circuitry may further be configured to forward the logged configuration message to the user equipment. In addition, the circuitry may be configured to receive a tagged logged measurement from the user equipment. In an example embodiment, the tagged logged measurement may identify during which connection state of the user equipment was in when the logged measurement was made.

BRIEF DESCRIPTION OF THE DRAWINGS

For proper understanding of example embodiments, reference should be made to the accompanying drawings, wherein.

DETAILED DESCRIPTION

Figure 1:
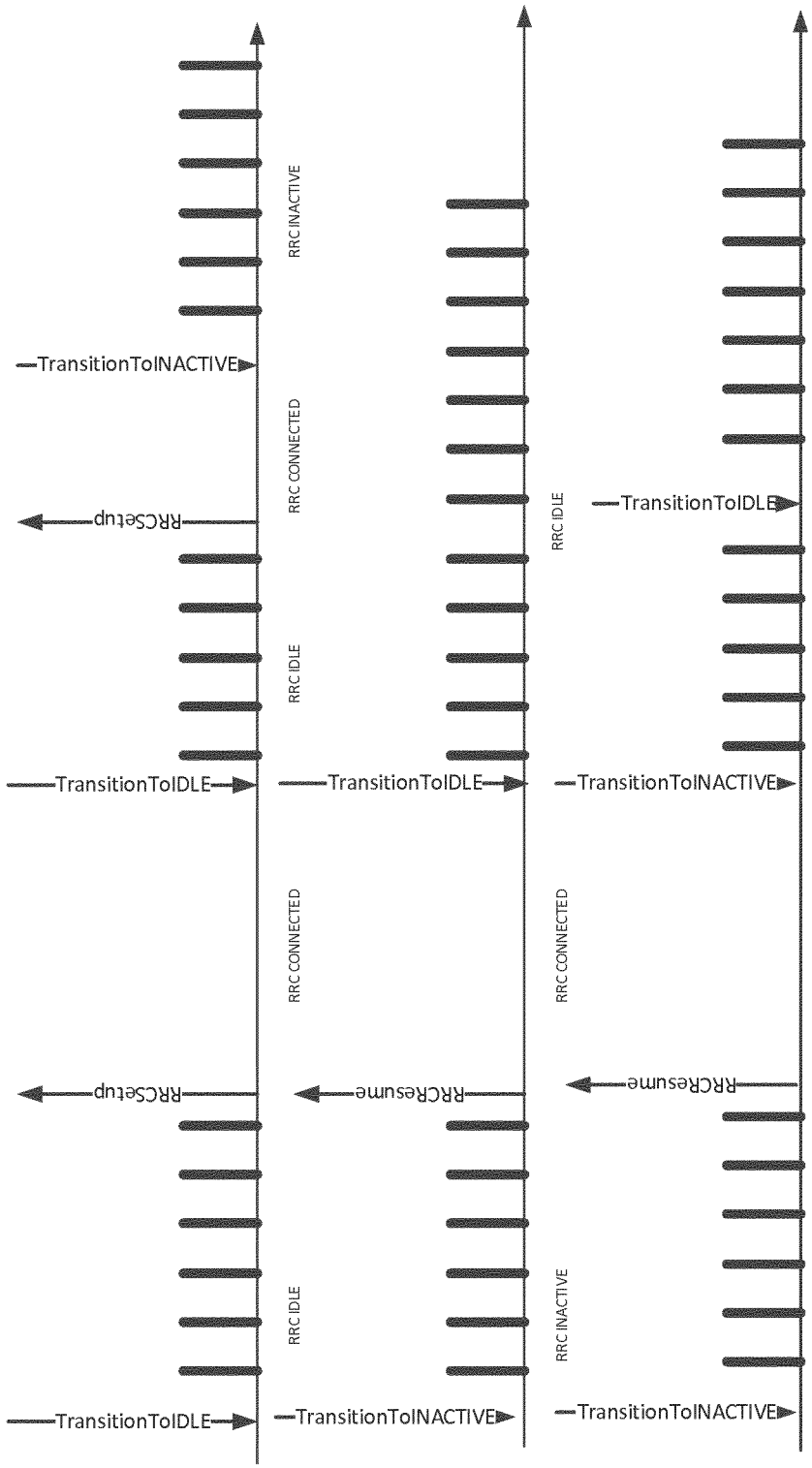
FIG. 1 illustrates an example of possible scenarios for taking minimization of drive test (MDT) log samples with regard to radio resource controller (RRC) state transitions.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for distinguishing minimization of drive test (MDT) logging through different radio resource controller (RRC) states.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

MDT is a standardized $3^{rd}$ Generation Partnership Project (3GPP) feature that involves commercial user equipments (UEs) in an automated collection of measurements, and reporting them to the network such as to a base station, eNB, or gNB. The fundamental concept aims at replacing dedicated and costly drive testing performed for network optimization.

MDT involves regular users of a cellular network, and makes usage of their data that are collected (e.g., for mobility purposes). In MDT, two MDT reporting approaches have been defined in Rel-10. One approach is immediate MDT reporting, and a second approach is logged MDT reporting. In immediate MDT reporting, the UE generates a real-time report of radio measurements immediately after performing them. However, in Rel-10 logged MDT reporting, the configuration is done when the UE is in connected mode, and the MDT data collection is done at the UE when the UE enters idle mode. Deferred reports in a form of logs may then be sent when the UE enters the connected mode. As such, MDT measurement records may be placed into MDT trace records and signaled to an operators' operations, administration and management (OAM) entity for further post-processing.

It has been described in 3GPP that radio access network (RAN) centric data collection aims at a mechanism to enable the operators to monitor and optimize their 5G deployments. The ultimate target has been to standardize a method for data collection and utilization. Self-organizing networks (SON) and MDT-oriented solutions (from LTE) have become a baseline for the newly standardized method for data collection. Thus, automated data collection in 5G inherits the two types of MDT reporting approaches to deliver real-time measurements (e.g., results of measurements performed for typical radio resource management (RRM) operations) and non-real time measurement results taken during the time the UE was out of network reach (in RRC_IDLE state), respectively. Further, logged MDT is part of the SI "Data Collection and Utilization" for new radio (NR) REl-16, and it has been agreed that in NR, the logged measurement should also be supported in RRC_INACTIVE state.

FIG. 1 illustrates an example of possible scenarios for taking MDT log samples with regard to RRC state transitions. The UE may be configured for logging via dedicated signaling in RRC_CONNECTED state. This configuration, however, takes place in advance, prior to entering the actual state of logging. Further, as illustrated in FIG. 1, as the RRC state delivers MDT log samples in either IDLE or INACTIVE, there are several possible scenarios to maintain the received configuration and continue acting on it. One scenario is where the UE transitions to IDLE and starts logging. A second scenario is when the UE transitions to INACTIVE and starts logging. A third scenario is when the UE transitions to INACTIVE and starts logging, and continues logging upon transitioning to IDLE. All these phases may be interrupted by transitioning to the RRC_CONNECTED state.

Figure 2:
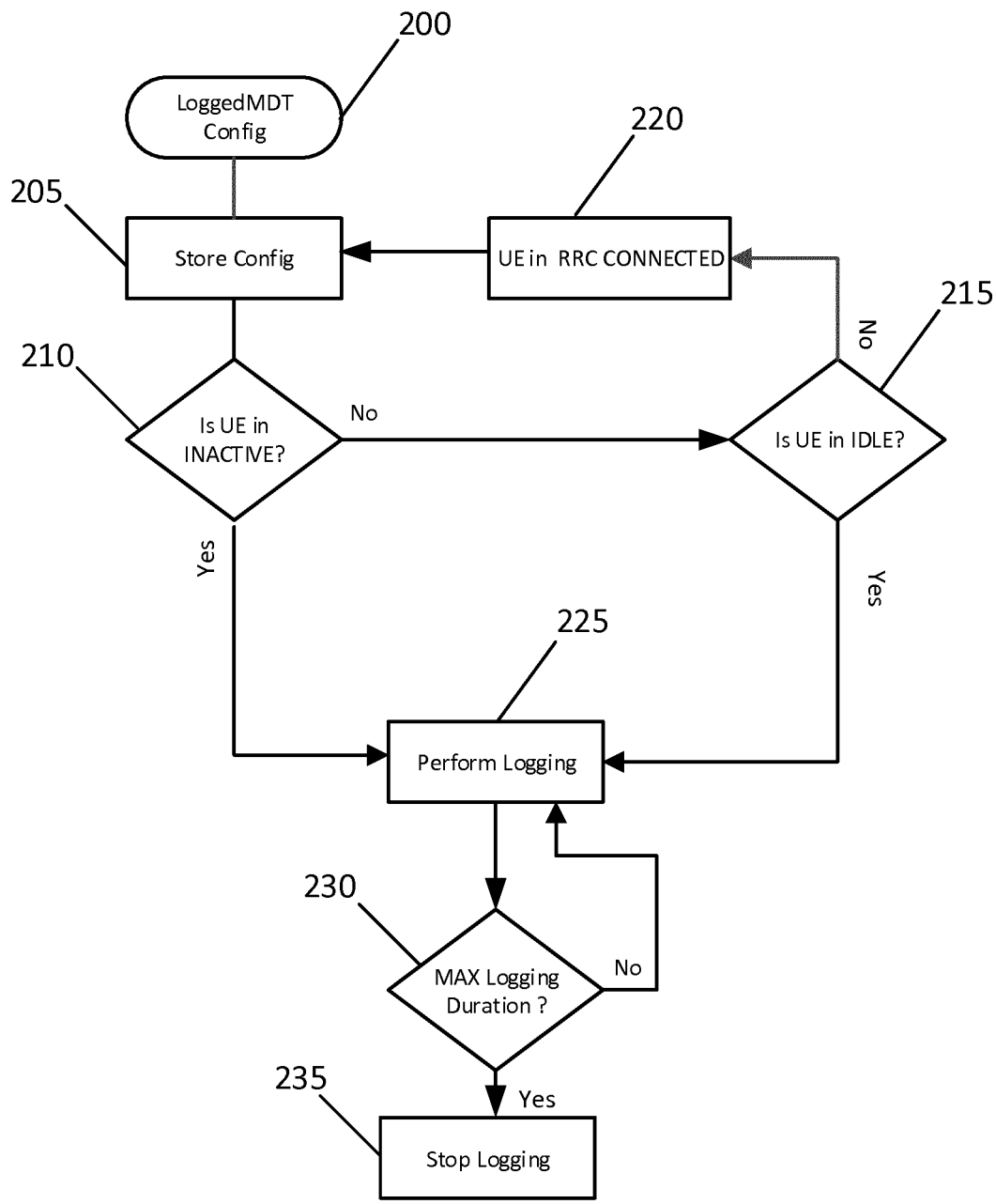
FIG. 2 illustrates a process for common logging from two RRC states.

FIG. 2 illustrates a process for common logging from two RRC states. If the existing LTE logged MDT configuration is applied to both states, there is no guarantee nor control given to the network. That is, the network does not have control of what data will become an outcome of the logging session. For instance, it may appear that logging in both states did not happen since the UE did not go through transitions of RRC_INACTIVE state to RRC_IDLE state. On the other hand, when the UE does go through RRC_INACTIVE state and RRC_IDLE state, distinguishing radio samples from two states is an additional burden for the network of 3rd party tools that may have to be developed to analyze the outcomes.

As illustrated in FIG. 2, the logging procedure may begin at 200 where logged MDT configuration may be provided from a network element. At 205, the logged MDT configuration may be stored at a user equipment. At 210, a determination may be made by the user equipment as to whether the UE is in RRC_INACTIVE state. If yes, at 225, the UE may perform logging. If no, at 215, a determination is made as to whether the UE is in RRC_IDLE state. If yes, at 225, the UE may perform logging. If no, at 220, it is determined that the UE is in RRC_CONNECTED state. After the UE performs logging, at 230, it is determined whether a maximum logging duration has been reached. If no, at 225, the UE may continue to perform logging. However, if yes, at 235, the UE stops logging.

Currently, it is not possible to distinguish logged measurement samples coming from RRC_IDLE or RRC_INACTIVE states. Thus, the network has no insight as to how many transitions the UE went through without any highly advanced analyses. Since the logging is common, it is activated in a common manner and results in the same nature of samples from two states.

Figure 3:
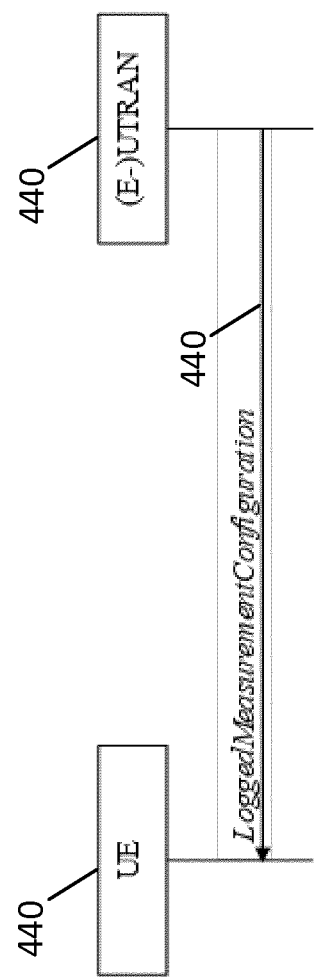
FIG. 3 illustrates an example MDT measurement configuration for logged MDT.

FIG. 3 illustrates an example MDT measurement configuration for logged MDT. In LTE, the network may configure a UE in an RRC_CONNECTED state with logged MDT measurements. For example, the configuration may be performed with a Logged Measurement Configuration message as illustrated in FIG. 3. For example, the (E-)UTRAN 305 may send a message 310 including the Logged Measurement Configuration to the UE 300.

A logged measurement configuration at a UE may be released if it is replaced by another logged MDT configuration, or when a configuration clearance occurs in the sense that some duration timer expires or another expiration condition is met. In existing LTE specifications, logged MDT measurements may only be configured for the RRC_IDLE state. The logged measurements may include configuration of downlink pilot strength measurement logging, and configuration of multicast-broadcast single-frequency network (MBSFN) measurement logging for E-UTRA. The logged measurements may also include configuration of the triggering of logging events. For example, only a periodic measurement trigger may be supported where the logging interval is configurable. Other than the period of measurements, a period for storing the measurements may be given. This period may be configured in seconds in multiples of applied IDLE mode discontinuous reception (DRX) (i.e., multiples of 1.28 s). Further, the UE behavior may be unspecified when the UE is configured with a DRX cycle larger than the logging interval.

The logged measurements may further include a network absolute time stamp to be used as a time reference to the UE, and include a trace reference parameter indicated by the OAM. Further, the logged measurements may include a trace recording session reference indicated by the OAM, and transmission configuration indication (TCI) identifier (ID) indicated by the OAM. Moreover, the logged measurements may include an MDT a public land mobile network (PLMN) list that indicates the PLMNs where measurement collection and log reporting are allowed. The indication may depend on whether the MDT is initiated by signaling (signaling based on MDT PLMN list), or by area based configuration (management based MDT PLMN list).

Furthermore, the logged measurements may include configuration of a logging area (optionally). In particular, the logging area defines that the UE will log measurements if it is within a configured logging area which may include a list of 32 global cell identities. If this list is configured, the UE will only log measurements when camping in any of these cells. The logging area may also include a list of up to 8 tracking areas (TAs) or 8 location areas (LAs) or 8 routing areas (RAs). If the list is configured, the UE will only log measurements when camping in any cell belonging to the preconfigured TA/LA/RAs.

In addition, the logged measurements may include configured logging areas that can span PLMNs in the MDT PLMN list. If no area is configured, then a UE will log measurements on all the PLMNs of the MDT PLMN list. The logged measurements may further include a configuration of target MBSFN area(s) for MBSFN measurement logging, and include configuration of WLAN measurements where the UE attempts to obtain WLAN measurements. In addition, the logged measurements may include a configuration of Bluetooth® measurements where the UE attempts to obtain Bluetooth® measurements.

Logged measurement configurations and logs may be maintained when the UE is in any state of a radio access technology (RAT), even if there exists multiple periods of interruptions when the UE is in a different RAT. Further, there exists a single logged measurement configuration for logged MDT in the UE for a RAT. In addition, when the network provides a configuration, previously configured logged measurement configurations will be replaced by the new configuration, and logged measurements corresponding to previous configurations will also be cleared. During these procedures, the network may retrieve data before it is deleted, such as for example, when a new configuration is given to the UE.

In certain cases, the UE may perform WLAN and Bluetooth® measurements only when indicated in the logging configuration. In addition, measurement logging may be performed during logging intervals for which WLAN and Bluetooth® measurements are available. For instance, measurement quantities for WLAN may consist of basic service set identification (BSSID), service set identification (SSID), homogeneous extended service set identification (HESSID)

of WLAN Aps, and optionally received signal strength indicator (RSSI) and round-trip time (RTT). For Bluetooth®, measurement logging may include medium access control (MAC) address of Bluetooth® beacons and optionally available RSSI.

In one case, the UE may collect MDT measurements and logs according to its configuration until its memory reserved for MDT is full. If this happens, the UE may stop logging, stop the log duration timer, and start the 48-hour timer.

In 3GPP, for RAN-centric data collection and utilization, several requirements were agreed for MDT at RRC_INACTIVE. For example, logged MDT should also be supported for RRC_INACTIVE and RRC_IDLE. It was also agreed to apply the logged MDT configuration, logged measurements, and reporting procedures to RRC_INACTIVE state. Further, for the logged MDT, the network may send logged measurement configurations to the UE in connected mode, and then the UE may collect measurements in RRC_IDLE/INACTIVE. Upon UE restarting the RRC connection, the UE may send available indicator(s) to the network, and then the network may command the UE to send the measurements.

Further, several agreements were made for MDT in RRC_INACTIVE. For instance, for UE measurements, in order to limit the impact on UE power consumption and processing, the UE measurement logging may rely on the measurements that are available in R15 NR and existing in LTE MDT as a baseline. Further, the agreements include the release operation for logged measurement configuration in the INACTIVE UE, which may be realized only by configuration replacement when the configuration is overwritten or by configuration clearance (due to logging duration expiration).

In a further agreement, for logged MDT measurement collection for RRC_INACTIVE UEs, the actual process of logging within the UE may take place in RRC_INACTIVE and continue in RRC_IDLE. In addition, the logged measurement stored in the UE during RRC_INACTIVE and IDLE states may be kept for a given common period before they are deleted as in LTE MDT. Further, MDT reporting from RRC_INACTIVE and IDLE states may be preceded by logs availability indicator that indicates the availability of logs at the UE.

According to certain example embodiments, the MDT logged measurement activation and contents may be differentiated for RRC_IDLE and RRC_INACTIVE states. For example, different MDT configurations may be provided depending on the state of the UE being in RRC_IDLE or RRC_INACTIVE.

In another example embodiment, the MDT configuration applicability may be indicated differently for IDLE and INACTIVE UEs. For example, the logged measurement configuration message, which by default may be meant for RRC_IDLE state, may be validated by the UE only after a direct transition from the RRC_CONNECTED state to the RRC_IDLE state. In an example embodiment, a separate validation for transition from the RRC_CONNTECTED state to the RRC_IDLE state may be provided. Further, the UE may check if it should apply the logging configuration to RRC_INACTIVE state. In addition, according to an example embodiment, validating by the UE corresponds to checking that the logging configuration is intended for the current state and applying it the logging configuration. In another example, the configuration applicability to RRC_INACTIVE may be validated by the network during transition to RRC_INACTIVE in a message that is used in the transition. According to an example embodiment, validation by the network may ensure that the configuration is suitable and applicable for the UE in RRC_INACTIVE that it will go to, and possibly adapt the logging configuration. In this case, validation may be performed by the base station. Following the configuration procedures, the UE may assist in distinguishing RRC states and indicate in logs, the RRC_INACTIVE state involvement. This may be done, for example, either by recording transitions between the states, or providing a separate indicator to enable MDT logs differentiation per different RRC state.

According to certain example embodiments, the configuration logged MDT configuration may be initiated by the core network with distinction to which RRC state the trigger for logged MDT is meant. This may imply specific signaling updates towards the RAN entity or access management function (AMF). Further, the origin of the signaling may be followed by the RAN entity with appropriate generation of the logged measurement configuration contents.

In certain example embodiments, the Logged Measurement Configuration message may by default, include settings that initially target the RRC_IDLE state. The Logged Measurement Configuration message may also be accompanied by additional information that is used for the configuration validation for RRC_INACTIVE. For example, validation of the logging configuration may take place during a transition of the UE from the RRC_CONNECTED state to the RRC_INACTIVE state. This implies that the logging configuration should be activated in the RRC_INACTIVE state (before transitioning to the RRC_IDLE state, if any).

According to an example embodiment, the Logged Measurement Configuration content may be sent with the message used to suspend the UE to the RRC_INACTIVE state. Alternatively, in another example embodiment, a logging configuration may be included in a SuspendConfig instruction and sent within an RRC release message to the UE. Here, the validation may take specific logging parameters that may apply to the RRC_INACTIVE state. For example, the specific logging parameters applied may include logging periodicity compared to the periodicity assumed for the RRC_IDLE state. Alternatively, the validation may be a simple flag where if indicated as TRUE, implies that the RRC_INACTIVE state UE should deliver logging samples. If it is indicated as FALSE, this would imply that the RRC_INACTIVE state UE should not deliver logging samples.

According to another example embodiment, the Logged Measurement Configuration may be generated specifically for the RRC_INACTIVE state in a way that triggers only RRC_INACTIVE state users to log (e.g., RAN area dedicated to RRC_INACTIVE users set as the logging area scope). This may result in different logging contents, even though the same signaling/message is reused.

Figure 4:
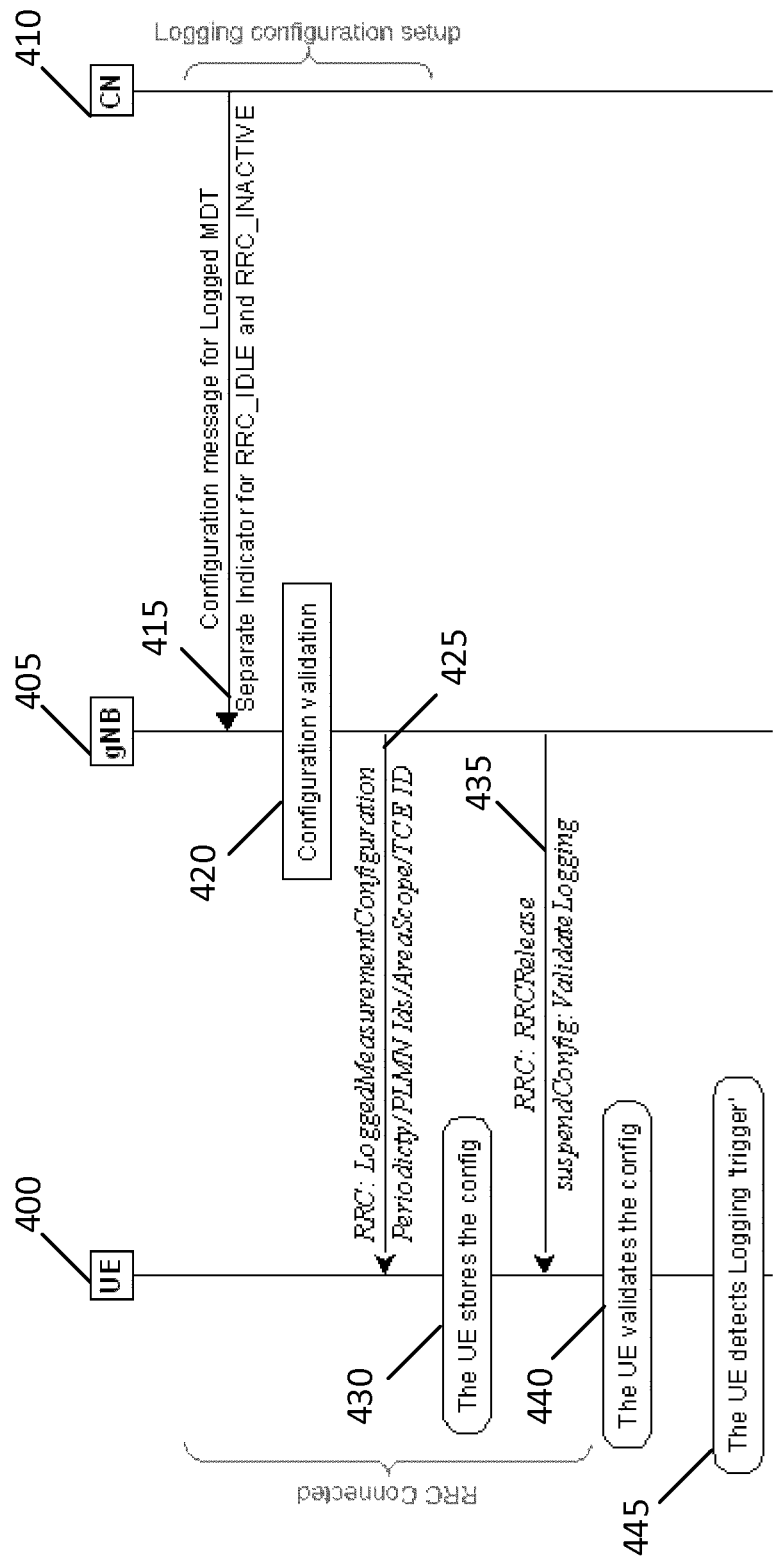
FIG. 4 illustrates an RRC_INACTIVE configuration validation for logged MDT, according to an example embodiment.

FIG. 4 illustrates an RRC_INACTIVE configuration validation procedure for logged MDT, according to an example embodiment. For example, the procedure may include, at 415, the core network element 410 sending a configuration message for logged MDT to the gNB 405. In an example embodiment, the configuration message may include separate indicators for RRC_IDLE and RRC_INACTIVE. Upon receipt, the gNB 405 may at 420, validate the configuration sent from the core network element 410. At 425, the gNB 405 may send an RRC Logged Measurement Configuration message to the UE 400. In an example embodiment, the Logged Measurement Configuration message 425 may specify different logging periodicities for RRC_IDLE and RRC_INACTIVE, different PLMN IDs, different area scopes for logging, different TECIDs. At 430, the UE 400 may store the configuration received at 425. At 435, the gNB 405 may send an RRC release message to the UE 400.

The RRC release message 435 may include a Suspend-Config to suspend the UE to an RRC_INACTIVE state. According to an example embodiment, the RRC release message may be used to send from RRC_CONNECTED to RRC_IDLE or RRC_INACTIVE. Further, as noted above, the SuspendConfig may be included in the RRC release message, meaning that the UE may go to RRC_INACTIVE state. In addition, SuspendConfig may include a ValidateLogging command, which may be a command from the network element to the UE. At 440, the UE 400 may validate the configuration received from the gNB 405. Further, at 445, the UE 400 may detect certain logging triggers, which may trigger the UE to begin logging procedures. As illustrated in FIG. 4, steps 415, 420, and 425 occur during the logging configuration setup stage. Further, steps 415, 420, 425, 430, and 435 occur while the UE us in the RRC_CONNECTED state.

According to certain example embodiments, the process of logging in RRC_INACTIVE state, triggered based on the various configurations described with respect to FIG. 4 above. For example, in one embodiment, the UE may start logging in RRC_INACTIVE state based on the validated configuration. According to an example embodiment, during logging, the UE may tag the measurement results from its states by RRC_INACTIVE attributes. Such attributes may include, for example, by RRC_INACTIVE specific notifications.

For example, in certain embodiments, the specific notifications may include an "inactive" tag, which determines that the samples come from a UE in the RRC_INACTIVE state. According to another example embodiment, the notification may include a "transition to IDLE," when the event takes place, to distinguish the raw samples recorded by the UE in RRC_INACTIVE state from those continued by the UE in RRC_IDLE state. In other example embodiments, the RRC_INACTIVE specific notifications may include RAN-based area update specific notifications, and RRC_INACTIVE specific events (e.g., RRC resumes failure). Thus, by using tags and notifications, it may be possible to distinguish logging measurement results between RRC_INACTIVE and RRC_IDLE states.

Figure 5A:
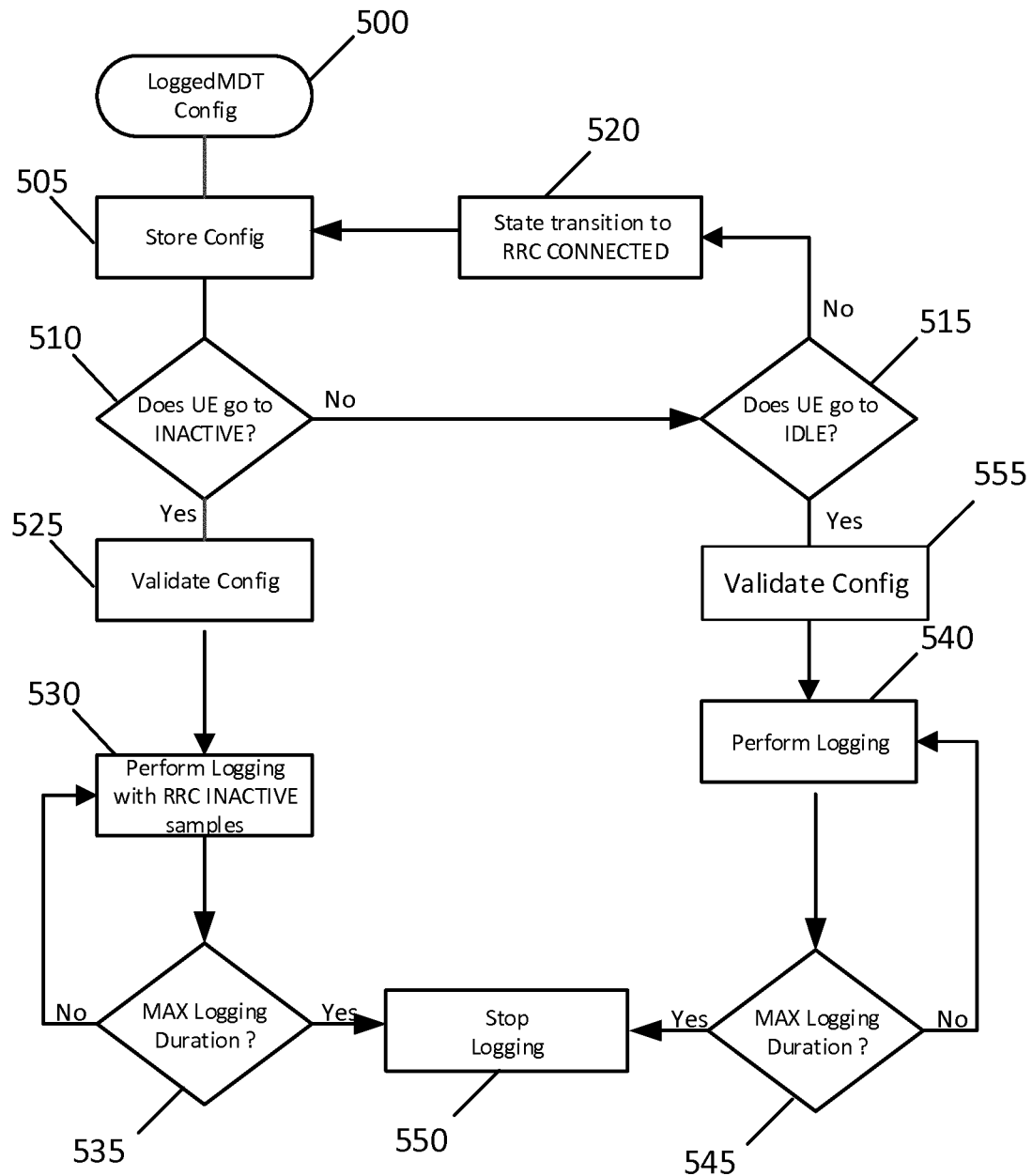
FIG. 5a illustrates a process for differentiated logging per RRC state, according to an example embodiment, where configuration validation occurs for each connection state that may apply logging.

FIG. 5a illustrates a process for differentiated logging per RRC state, according to an example embodiment, where configuration validation occurs for each connection state that may apply logging. For instance, at 500, logged MDT configurations may be provided from a core network element. At 505, the logged MDT configurations may be stored at the UE. At 510, a determination may be made by the UE as to whether the UE is in RRC_INACTIVE state. If yes, at 525, the UE may validate the configuration, and at 530, the UE may begin performing logging with RRC_INACTIVE samples. At 535, it may be determined whether a maximum logging duration has been reached. If not, the procedure may return to 530 where the UE continues to perform logging. If yes, at 550, the UE stops logging.

If at 510 it is determined that the UE is not in an RRC_INACTIVE state, at 515, a determination is made as to whether the UE is in RRC_IDLE state. If yes, at 555, the UE may validate the configuration, and at 540, the UE may perform logging. If no, at 520, it is determined that the UE is in RRC_CONNECTED state. After the UE performs logging, at 545, it is determined whether a maximum logging duration has been reached. If no, the procedure returns to 540 in which the UE continues to perform logging. If yes, at 550, the UE stops logging.

Figure 5B:
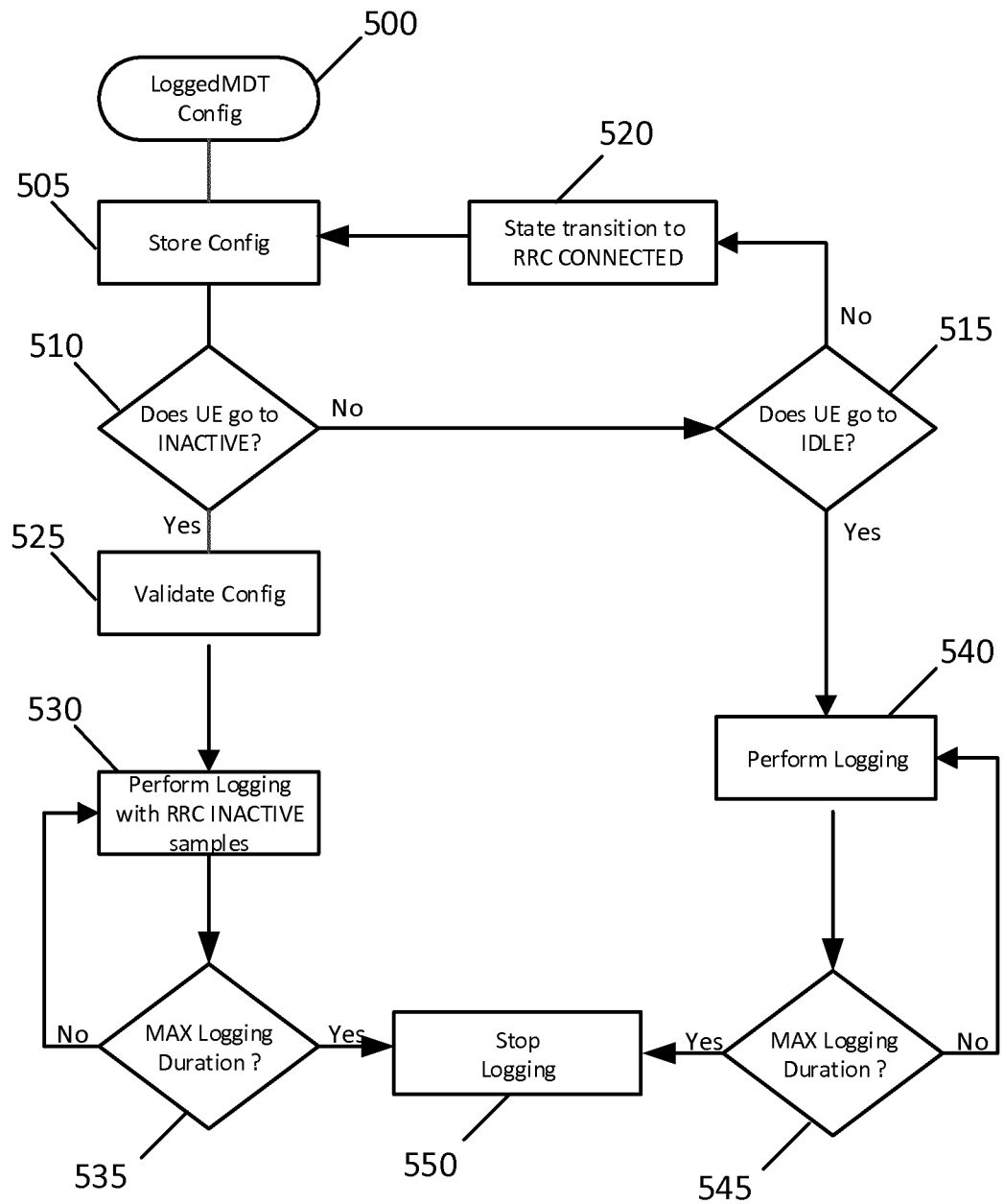
FIG. 5b illustrates a process for differentiated logging per RRC state, according to an example embodiment, where configuration validation may occur at a network element prior to transitioning the UE to RRC_INACTIVE.

FIG. 5b illustrates a process for differentiated logging per RRC state, according to an example embodiment, where configuration validation occurs for RRC_INACTIVE only. For instance, at 500, logged MDT configurations may be provided from a core network element. At 505, the logged MDT configurations may be stored at an access point such as a gNB. At 510, a determination may be made by the network as to whether the UE is in RRC_INACTIVE state. If yes, at 525, the gNB may validate the configuration, and at 530, the UE may begin performing logging with RRC_INACTIVE samples. At 535, it may be determined whether a maximum logging duration has been reached. If not, the procedure may return to 530 where the UE continues to perform logging. If yes, at 550, the UE stops logging.

If at 510 it is determined that the UE is not in an RRC_INACTIVE state, at 515, a determination is made as to whether the UE is in RRC_IDLE state. If yes, at 540, the UE may perform logging. If no, at 520, it is determined that the UE is in RRC_CONNECTED state. After the UE performs logging, at 545, it is determined whether a maximum logging duration has been reached. If no, the procedure returns to 540 in which the UE continues to perform logging. If yes, at 550, the UE stops logging.

Figure 6:
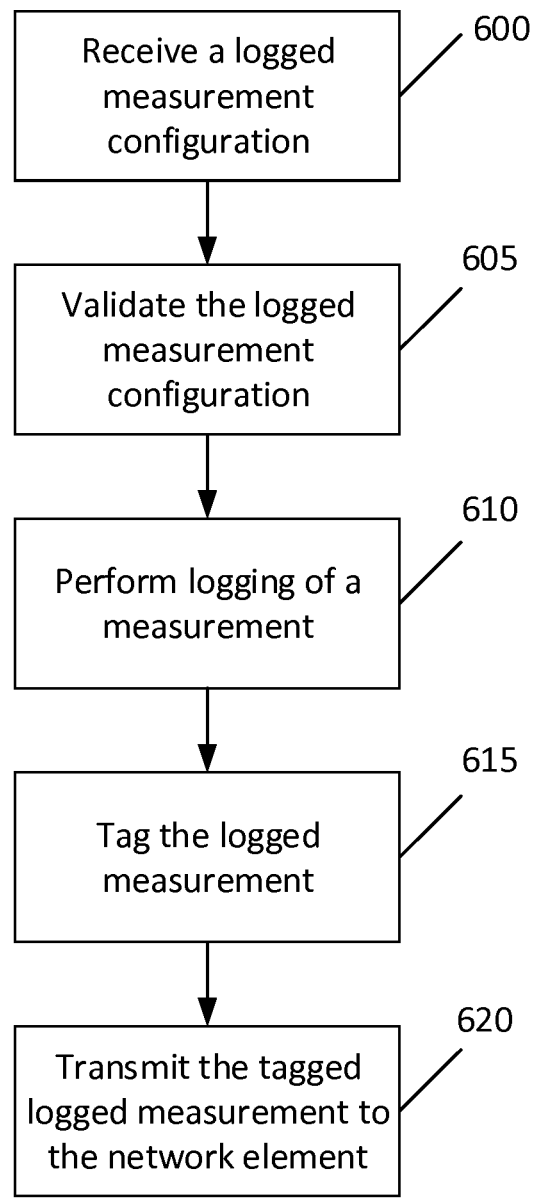
FIG. 6 illustrates a flow diagram of a method, according to an example embodiment.

FIG. 6 illustrates a flow diagram of a method, according to an example embodiment. In certain example embodiments, the flow diagram of FIG. 6 may be performed by a mobile station and/or UE, for instance similar to apparatus 10 illustrated in FIG. 8a. According to one example embodiment, the method of FIG. 6 may include initially at 600, receiving, from a network element, a logged measurement configuration including specific content for a user equipment depending on a connection state of the user equipment. The method may also include at 605, validating the logged measurement configuration, wherein the validating may be embodied by the network element prior to transitioning to a different user equipment state, or by a user equipment after entering a logging state, for which the logged measurement configuration was designated. In addition, the method may include at 610, performing logging of a measurement according to the content of the logged measurement configuration. Further, the method may include at 615, tagging the logged measurement. The method may also include, at 620, transmitting the tagged logged measurement to the network element.

According to an example embodiment, the tagging may identify during which connection state of the user equipment was in when the logged measurement was made. According to another example embodiment, the connection state of the user equipment may include a radio resource controller connected state, a radio resource controller inactive state, and a radio resource controller idle state. In a further example embodiment, the logged measurement configuration may be specified for logged minimization of drive test measurements. In another example embodiment, the tagging may include one or more of a notification of a transition between one connection state of the user equipment to another connection state of the user equipment, a radio access network-based area update specific notification, and radio resource controller inactive specific events.

According to another example embodiment, the logging may be performed when the user equipment enters the radio resource controller inactive state. In a further example embodiment, the validating may take place during a transition from the radio resource controller connected state to the radio resource controller inactive state. According to a further example embodiment, the validating may take place only after a direct transition from the radio resource controller connected state to the radio resource controller idle state. In another example embodiment, the logged measurement configuration may specify at least one of a logging periodicity according to the connection state of the user equipment, a logging area scope for logging according to the connection state of the user equipment, a trigger for logging measurements according to the connection state of the user equipment.

Figure 7:
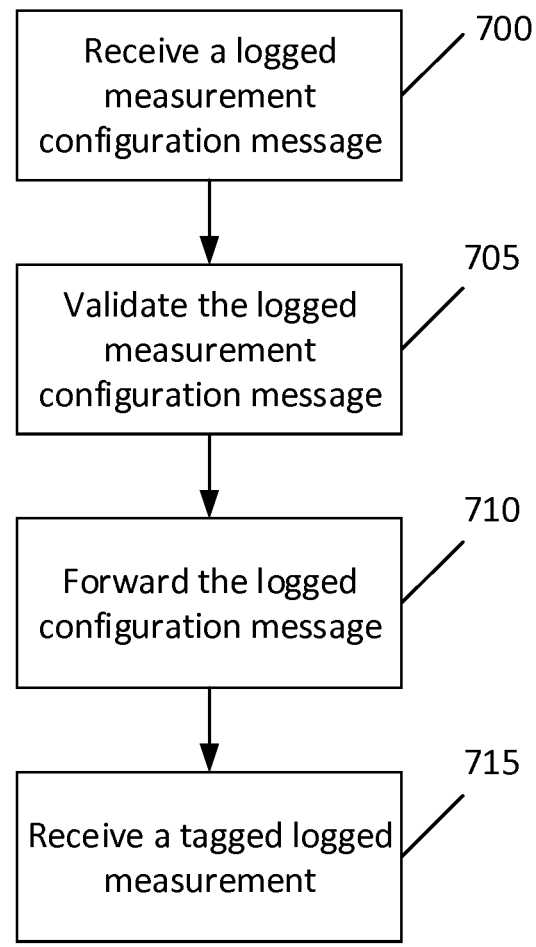
FIG. 7 illustrates a flow diagram of another method, according to an example embodiment.

FIG. 7 illustrates a flow diagram of another method, according to an example embodiment. In certain example embodiments, the flow diagram of FIG. 7 may be performed by a network entity or network node in a 3GPP system, such as LTE or 5G-NR. For instance, in some example embodiments, the method of FIG. 7 may be performed by a base station, eNB, or gNB, for instance similar to apparatus 20 illustrated in FIG. 8b.

According to one example embodiment, the method of FIG. 7 may include initially, at 700, receiving, from a core network element, a logged measurement configuration including specific content for a user equipment depending on a connection state of the user equipment. The method may also include, at 705, validating the logged measurement configuration prior to transitioning the user equipment to a different connection state. The method may further include, at 710, forwarding the logged configuration message to the user equipment. In addition, the method may include, at 715, receiving a tagged logged measurement from the user equipment.

In an example embodiment, the tagged logged measurement may identify during which connection state of the user equipment was in when the logged measurement was made. In another example embodiment, the logged measurement configuration may be specified for logged minimization of drive test measurements. According to an example embodiment, the logged measurement configuration may specify at least one of a logging periodicity according to the connection state of the user equipment, a logging area scope for logging according to the connection state of the user equipment, a trigger for logging measurements according to the connection state of the user equipment. According to another example embodiment, the logged measurement configuration may trigger the user equipment to transition from one connection state to another connection state. According to a further example embodiment, the connection state of the user equipment may include a radio resource controller connected state, a radio resource controller inactive state, and a radio resource controller idle state. In another example embodiment, the logged measurement configuration may be adapted to the radio resource controller inactive state by changing one or more logging parameters.

Figure 8A:
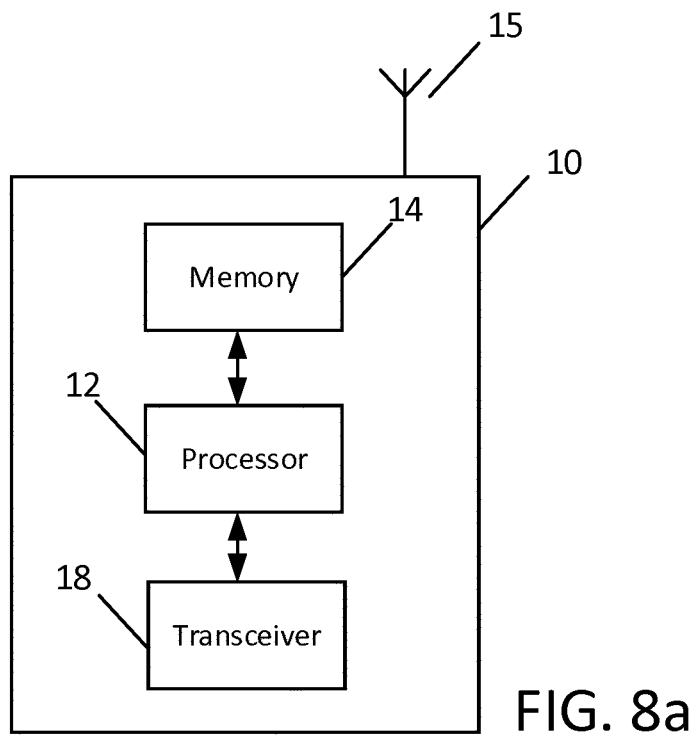
FIG. 8a illustrates a block diagram of an apparatus, according to an example embodiment.

FIG. 8a illustrates an example apparatus 10 according to an example embodiment. In an embodiment, apparatus 10 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 10 may be implemented in, for instance, a wireless handheld device, a wireless plug-in accessory, or the like.

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8a.

As illustrated in the example of FIG. 8a, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

While a single processor 12 is shown in FIG. 8a, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 18 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 10 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a UE, mobile device, mobile station, ME, IoT device and/or NB-IoT device, for example. According to certain embodiments, apparatus 10 may be controlled by memory 14 and processor 12 to perform the functions associated with example embodiments described herein. For example, in some embodiments, apparatus 10 may be configured to perform one or more of the processes depicted in any of the flow charts or signaling diagrams described herein, such as the flow diagrams illustrated in FIGS. 1-6.

For instance, in one embodiment, apparatus 10 may be controlled by memory 14 and processor 12 to receive, from a network element, a logged measurement configuration including specific content for a user equipment depending on a connection state of the user equipment. Apparatus 10 may also be controlled by memory 14 and processor 12 to validate the logged measurement configuration, wherein the validating may be embodied by the network element prior to transitioning to a different user equipment state, or by a user equipment after entering a logging state, for which the logged measurement configuration was designated. Apparatus 10 may further be controlled by memory 14 and processor 12 to perform logging of measurements according to the content of the logged measurement configuration. Apparatus 10 may further be controlled by memory 14 and processor 12 to tag the logged measurements. In addition, apparatus 10 may be controlled by memory 14 and processor 12 to transmit the tagged logged measurement to the network element. In an example embodiment, the tagging may identify during which connection state of the user equipment was in when the logged measurements were made.

Figure 8B:
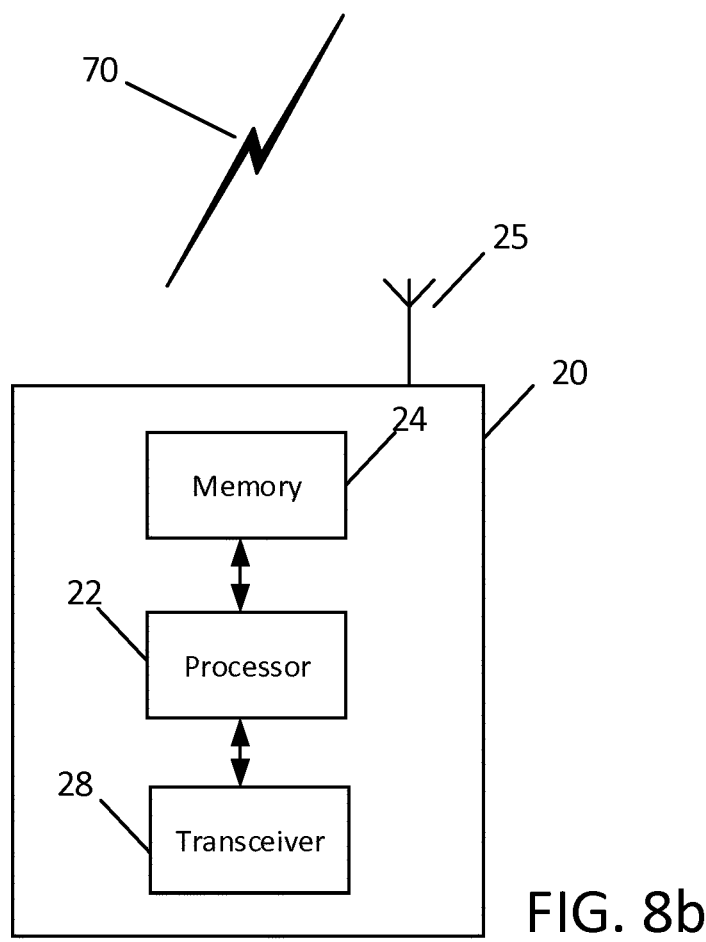
FIG. 8b illustrates a block diagram of another, apparatus according to an example embodiment.

FIG. 8b illustrates an example of an apparatus 20 according to an example embodiment. In an example embodiment, apparatus 20 may be a node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. In certain example embodiments, apparatus 20 may be an eNB in LTE or gNB in 5G.

It should be understood that, in some example embodiments, apparatus 20 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 20 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 20 may include components or features not shown in FIG. 8b.

As illustrated in the example of FIG. 8b, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain example embodiments, apparatus 20 may be a network node or RAN node, such as a base station, access point, Node B, eNB, gNB, WLAN access point, or the like. In another example embodiment, apparatus 20 may be an LFM. According to certain embodiments, apparatus 20 may be controlled by memory 24 and processor 22 to perform the functions associated with any of the embodiments described herein, such as the flow or signaling diagrams illustrated in FIGS. 1-5, and 7.

For instance, in one embodiment, apparatus 20 may be controlled by memory 24 and processor 22 to receive, from a core network element, a logged measurement configuration including specific content for a user equipment depending on a connection state of the user equipment. Apparatus 20 may also be controlled by memory 24 and processor 22 to validate the logged measurement configuration prior to transitioning the user equipment to a different connection state. Apparatus 20 may further be controlled by memory 24 and processor 22 to forward the logged configuration message to the user equipment. In addition, apparatus 20 may be controlled by memory 24 and processor 22 to receive a tagged logged measurement from the user equipment. In an example embodiment, the tagged logged measurement may identify during which connection state of the user equipment was in when the logged measurement was made.

Certain example embodiments described herein provide several technical improvements, enhancements, and/or advantages. In some example embodiments, it may be possible to provide a network that is in control of logged measurement results per RRC state. It may also be possible for delivered data to enable easier analysis of the RRC-state specific records that allow the network to perform more specific troubleshooting. For example, the RRC state specific records may include dedicated records for RRC_IDLE users and RRC_INACTIVE users. Thus, according to certain example embodiments, it may be possible to distinguish in which state the measurements were done. It may be also possible to detect and monitor radio signal levels per user equipment's state.

In other example embodiments, it may be possible to provide a network that triggers the MDT logging for INACTIVE state UEs by amending the RRC release message. According to further example embodiments, it may be possible for UEs to tag the measurement results to indicate the RRC state. As such, certain example embodiments provide a way to differentiate MDT logged measurement activation and contents for RRC_IDLE and RRC_INACTIVE states, which has not previously been provided for.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

Partial Glossary

3GPP 3$^{rd}$ Generation Partnership Project
AMF Access Management Function
eNB Enhanced Node B
gNB 5G or NR Base Station
LTE Long Term Evolution
MDT Minimization of Drive Tests
NR New Radio
OAM Operations, Administration and Management
PLMN Public Land Mobile Network
RAN Radio Access Network
RRC Radio Resource Controller
RRM Radio Resource Management
UE User Equipment

We claim:

1. A method, comprising:
receiving, from a network element, a logged measurement configuration comprising specific content for a user equipment depending on a connection state of the user equipment;
validating the logged measurement configuration, wherein the validating is embodied by the network element prior to transitioning to a different user equipment state, or by a user equipment after entering a logging state, for which the logged measurement configuration was designated;
performing logging of a measurement according to the content of the logged measurement configuration;
tagging the logged measurement; and
transmitting the tagged logged measurement to the network element,
wherein the tagging identifies during which connection state of the user equipment was in when the logged measurement was made.

2. The method according to claim 1, wherein the connection state of the user equipment comprises a radio resource controller connected state, a radio resource controller inactive state, and a radio resource controller idle state.

3. The method according to claim 1, wherein the logged measurement configuration is specified for logged minimization of drive test measurements.

4. The method according to claim 1, wherein the tagging comprises one or more of a notification of a transition between one connection state of the user equipment to another connection state of the user equipment, a radio access network-based area update specific notification, and radio resource controller inactive specific events.

5. The method according to claim 1, wherein the logging is performed when the user equipment enters the radio resource controller inactive state.

6. The method according to claim 1, wherein the validating takes place during a transition from the radio resource controller connected state to the radio resource controller inactive state.

7. The method according to claim 1, wherein the logged measurement configuration specifies at least one of a logging periodicity according to the connection state of the user equipment, a logging area scope for logging according to the connection state of the user equipment, a trigger for logging measurements according to the connection state of the user equipment.

8. A method, comprising:
receiving, from a core network element, a logged measurement configuration comprising specific content for a user equipment depending on a connection state of the user equipment;
validating the logged measurement configuration prior to transitioning the user equipment to a different connection state;
forwarding the logged configuration message to the user equipment; and
receiving a tagged logged measurement from the user equipment,
wherein the tagged logged measurement identifies during which connection state of the user equipment was in when the logged measurement was made.

9. The method according to claim 8, wherein the logged measurement configuration is specified for logged minimization of drive test measurements.

10. The method according to claim 8, wherein the logged measurement configuration specifies at least one of a logging periodicity according to the connection state of the user equipment, a logging area scope for logging according to the connection state of the user equipment, a trigger for logging measurements according to the connection state of the user equipment.

11. The method according to claim 8,
wherein the logged measurement configuration triggers the user equipment to transition from one connection state to another connection state, and
wherein the connection state of the user equipment comprises a radio resource controller connected state, a radio resource controller inactive state, and a radio resource controller idle state.

12. The method according to claim 8, wherein the logged measurement configuration is adapted to the radio resource controller inactive state by changing one or more logging parameters.

13. An apparatus, comprising:
at least one processor; and
at least one memory comprising computer program code,
the at least one memory and the computer program code are configured, with the at least one processor to cause the apparatus at least to
receive, from a network element, a logged measurement configuration comprising specific content for the apparatus depending on a connection state of the user equipment;
validate the logged measurement configuration, wherein the validating is embodied by the network element prior to transitioning to a different user equipment state, or by the apparatus after entering a logging state, for which the logged measurement configuration was designated;
perform logging of measurements according to the content of the logged measurement configuration;
tag the logged measurements; and
transmit the tagged logged measurement to the network element,
wherein the tagging identifies during which connection state of the user equipment was in when the logged measurements were made.

14. The apparatus according to claim 13, wherein the connection state of the user equipment comprises a radio resource controller connected state, a radio resource controller inactive state, and a radio resource controller idle state.

15. The apparatus according to claim 13, wherein the logged measurement configuration is specified for logged minimization of drive test measurements.

16. The apparatus according to claim 13, wherein the tagging comprises one or more of a notification of a transition between one connection state of the user equipment to another connection state of the user equipment, a radio access network-based area update specific notification, and radio resource controller inactive specific events.

17. The apparatus according to claim 13, wherein the logging is performed when the user equipment enters the radio resource controller inactive state.

18. The apparatus according to claim 13, wherein the validating takes place during a transition from the radio resource controller connected state to the radio resource controller inactive state.

19. The apparatus according to claim 13, wherein the logged measurement configuration specifies at least one of a logging periodicity according to the connection state of the user equipment, a logging area scope for logging according to the connection state of the user equipment, a trigger for logging measurements according to the connection state of the user equipment.

\* \* \* \* \*